United States Patent [19]

Leaning

[11] Patent Number: 4,930,013

[45] Date of Patent: May 29, 1990

[54] PATTERN PROCESSING

[75] Inventor: Anthony R. Leaning, Ipswich, England

[73] Assignee: British Telecommunications public limited company, Great Britain

[21] Appl. No.: 221,790

[22] PCT Filed: Nov. 17, 1987

[86] PCT No.: PCT/GB87/00816

§ 371 Date: Sep. 2, 1988

§ 102(e) Date: Sep. 2, 1988

[87] PCT Pub. No.: WO88/04084

PCT Pub. Date: Jun. 2, 1988

[30] Foreign Application Priority Data

Nov. 20, 1986 [GB] United Kingdom ............... 8627787

[51] Int. Cl.$^5$ .................... G06K 9/62; H04N 7/137
[52] U.S. Cl. ................... 358/133; 358/105; 358/903
[58] Field of Search ............ 358/133, 8, 105, 25, 358/12, 89, 903

[56] References Cited

U.S. PATENT DOCUMENTS 4,558,350 12/1985 Murakami ........................ 358/133
4,779,131 10/1988 Matsumoto ...................... 358/105

FOREIGN PATENT DOCUMENTS 0192929 9/1986 European Pat. Off. .
53-036284 4/1978 Japan ................................ 358/10
55-105475 8/1980 Japan ................................ 358/12

OTHER PUBLICATIONS

IEEE Transactions on Communications, vol. COM-24, No. 4, Apr. 1986, B. G. Haskell: "Differential Addressing of Clusters of Changed Picture Elements for Interframe Coding of Videotelephone Signals", pp. 140-144.
IEEE Transactions of Communications, vol. 34, No. 4, Apr. 1986, IEEE, (New York, US), M. J. Bage: "Interframe Predictive Coding of Images Using Hybrid Vector Quantization", pp. 411-415.

Primary Examiner—Howard W. Britton
Attorney, Agent, or Firm—Nixon & Vanderhye

[57] ABSTRACT

A two dimensional pattern such as a movement matrix generated in an inter-frame video coder is classified by forming a weighted sum modulo x of a set of values representing the pattern. The values may be pattern element values, or quantised representations of groups of elements. The weighted sum is used to access a lookup table containing class identification words. Optionally, motion vectors may be generated by comparing class identification words derived from successive frames of a picture.

16 Claims, 5 Drawing Sheets

| PREVIOUS | | CURRENT | | |
|---|---|---|---|---|
| $Z_{11}$ | | $Z_6$ | | (a) |
| $Z_6$ | | $Z_{13}$ | | (b) |
| $Z_2$ | | $Z_{13}$ | | (c) |

PATTERN PROCESSING

The present invention relates to pattern processing and is particularly, though not exclusively, concerned with the application of such processing to the coding of video signals.

One example is in video coders employing interframe conditional replenishment coding for the transmission of moving pictures. The difference is taken between picture element values and predicted values (ie those from the preceding frame). The differences are applied to a threshold circuit which for each difference value produces a '1' or a '0' indicating whether or not a threshold value is exceeded, thereby forming a "movement matrix". Only those element values (or, if preferred, element differences) having a '1' in the coresponding element of the movement matrix are coded for transmission.

At the receiver, the received information is used to update an image stored in a local frame store. In order that the receiver can correctly decode the received information side information indicating which coefficients have been sent must be included in the transmission. Sending all bits of the movement matrix represents a substantial overhead, and it has therefore been proposed to divide the picture into $8 \times 8$ blocks and "vector quantise" each $8 \times 8$ movement matrix be matching it to the nearest one of a set of (eg) 32 patterns which can be identified to the receiver using only five transmitted bits. Hitherto this matching has been achieved using a correlation method with the patterns; this is computationally extravagant and even with high speed processing 32 patterns is the maximum normally practicable in real time.

The technique is also applicable to so-called hybrid video coders where a combination of transform coding and inter-frame conditional replenishment coding is employed. Transform coding involves applying a two dimensional transform such as the Hadamard or discrete cosine (DCT) transform to (eg $8 \times 8$) blocks of picture elements to produce corrsponding matrix of transform coefficients (transformation of a whole frame at once is too slow for real time processing). Here the movement matrix is based on the differences between the coefficients of the matrix of the current frame and that from the preceding frame.

In a variant of this procedure, the taking of interframe differences may precede the transformation rather than follow it.

According to one aspect of the present invention there is provided a method of classifying a set of values representing a two dimensional pattern comprising forming a weighted sum of those values, modulo x, where x is an integer less than $2^p$, p being the number of values in the set, and employing the sum as an address to access a store having x locations each containing a class identification word.

In principle the values referred to could be the value associated with each element of the pattern, but the summation may be simplified and the derivation of the weighting coefficients and modulus facilitated by first forming a set of values each of which represents a number of elements. Thus a preferred embodiment of the invention includes deriving the set of values by identifying, for each of a plurality of groups of elements of the pattern, that one of a set of predefined such groups, each of which has a code associated with it, which that group most closely resembles according to a predetermined criterion, the codes associated with the groups thus identified forming the set of values.

The groups may be the rows (or columns) of a rectangular pattern matrix, though other selections are possible.

One embodiment of the present invention will now be described, by way of example, with reference to the accompanying drawings, in which.

The arrangements to be described are employed in a video coder which is assumed to form, as described in the introduction, for each of a number of $8 \times 8$ pixel blocks, an $8 \times 8$ movement matrix each element of which is a single bit indicating whether the corresponding picture element (or transform coefficient) has substantially changed between frames.

The problem discussed above is one of assigning $2^{64}$ possible patterns into a smaller number (32) of classes. In theory, this could be achieved by using a look-up table having $2^{64}$ locations each containing a five-bit number indicating to which class the pattern belongs, but clearly a table of such a size is impractical. Even if the matrix is preprocessed by vector quantising the rows of the matrix, representing each 8-bit line by 5 bits, the table size is still $2^{40}$. The proposed method uses a modulo x summation function to map the $2^{64}$ ($2^{40}$) patterns into a smaller number x of classes. The values of the coefficients of the summation function and the modulus x must of course be selected to suit the desired set of patterns, as will be described below. Whilst in exceptional cases a particular set of patterns might enable x to equal the number of classes, in general this is not so, but in practice it is found that x can be made small enough to enable a look-up table to be constructed with x locations each containing a five-bit number identifying one of the 32 classes.

Figure 1:
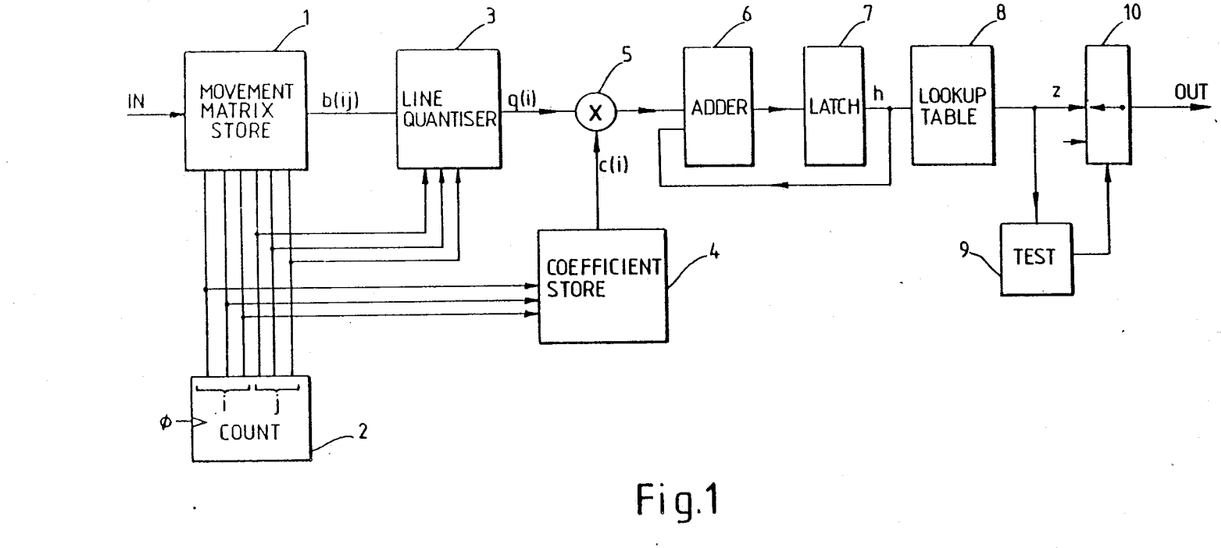
FIG. 1 is a block diagram of an apparatus for vector quantisation of movement matrices.

FIG. 1 shows an arrangement, forming part of a video coder, which arrangement serves to idenfity which of 32 standard patterns an input $8 \times 8 \times 1$ bit movement matrix most closely resembles. The movement matrix with one bit $b(i,j)$ per element is assumed to have been generated and is stored in a 64-bit buffer memory 1. A 6-bit address counter 2 is clocked to generate addresses from 0 to 63 which are applied to address inputs of the memory 1. The data output $b(i,j)$ of the memory 1 and column addresses j are applied to a line quantiser 3 which produces a five bit line vector code $q(i)$. The row addresses i are applied to address inputs of a read only coefficient memory 4 having 8 locations each containing an 8 bit coefficient $c(i)$. The line vector codes $q(i)$ and data outputs of the memory 4 are supplied to a multiplier 5 which forms the product. The products are applied to accumulator comprising a modulo x adder 6 and a 16 bit latch 7 whose output is fed back to one input of the adder. The modulus cannot exceed $2^{16}$, of course.

The accumulator output forms the address input to a look-up table consisting of a further read-only memory 8 having $2^{16}=64$K locations (only x of which are used); each contains a five bit word identifying one of 32 pattern classes to which the input movement matrices are to be assigned.

The data output 8 of the memory 7 thus offers the five bit word selected from the table according to the value of the modulo x sum.

Considering the process in more detail, it has been assumed that the input pattern consists of an 8×8 matrix B each element b(ij) of which is a single bit indicating whether a corresponding picture element (pixel) of an image has been judged to be moving ("1") or not ("0"). This is a significant factor in finding the criterion for resemblance since it is preferable to represent a pixel as moving when it is not than to represent a moving pixel as stationary.

Figure 2:
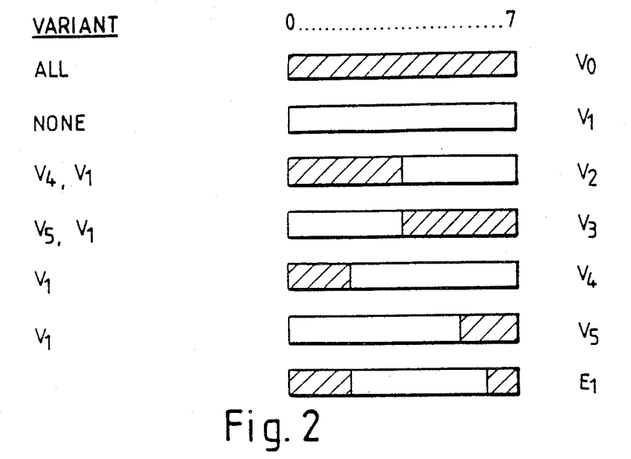
FIG. 2 illustrates a set of standard line vectors.

In the line quantiser 3, the information content of the 8×8×1 matrix is "line" quantised in that each horizontal line of 8×1 bits is matched to the nearest one of a set of 8×1 base vectors. Six base vectors are assumed as shown in FIG. 2. Note that it is not in principle necessary that the groups of 8 bits subjected to this process should be derived from lines of the input marix; other selections are also possible. Each base vector is represented by a code $v_0 \ldots v_5$. These could in principle be the integers 0 to 6; however, other selections are found to produce superior results. In particular, widely spaced numbers, mainly prime numbers, in the range 0 to 255 have been found preferable—e.g. 141, 95, 111, 173, 237, 29, 192, 224 or 149, 97, 113, 173, 239, 29, 137, 43.

The set must be selected manually, but comparisons of possible candidate sets may be compared by applying the coefficient iteration algorithm described below to each (using the same random number in each case). That set giving the most rapid convergence is believed to be superior.

The matching process requires that an input line having a "1" in any position should not be matched to a base vector having a "0" in that position. For example the example input line E1 shown in FIG. 2 cannot match to V4 (ostensibly the closest) because of the "1" in position 7; it must be matched to $v_0$.

Thus one proceeds by identifying the base vector(s) having "1" in all positions at which the input line has a "1". If there is more than one, the closest of these, in terms of having the smallest number of bits differing from the corresponding bits in the input line, is selected.

The 8×8 input matrix has now been converted to a vector [q(i)] having 8 elements.

This vector is now further quantised by the multiplier 5 and accumulator 6, 7 with the aid of the coefficient store 4 by forming a weighted sum h of its elements, modulo x, viz:

$$h = \sum_{i=0}^{i=7} q(i) \cdot c(i) \quad \text{MODx}$$

(This definition is referred to in the following description as a summation function).

Figure 3:
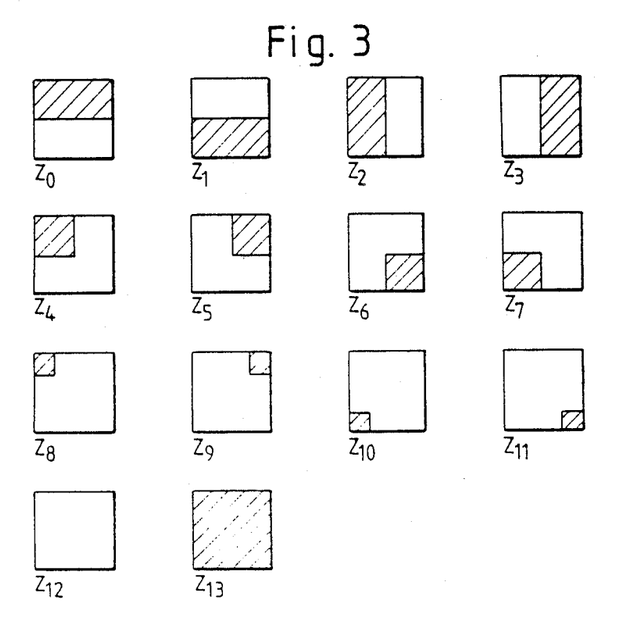
FIG. 3 illustrates a set of standard patterns.

The input matrix having thus been converted to a scalar sum (of range 0 to x) this is then used to access the look-up table of memory 8 from which can be read out code words indicating that one of the standard patterns which is to be used. Fourteen examples of standard patterns are shown in FIG. 3, along with the corresponding codes $Z_0 \ldots Z_{13}$.

Figure 4:
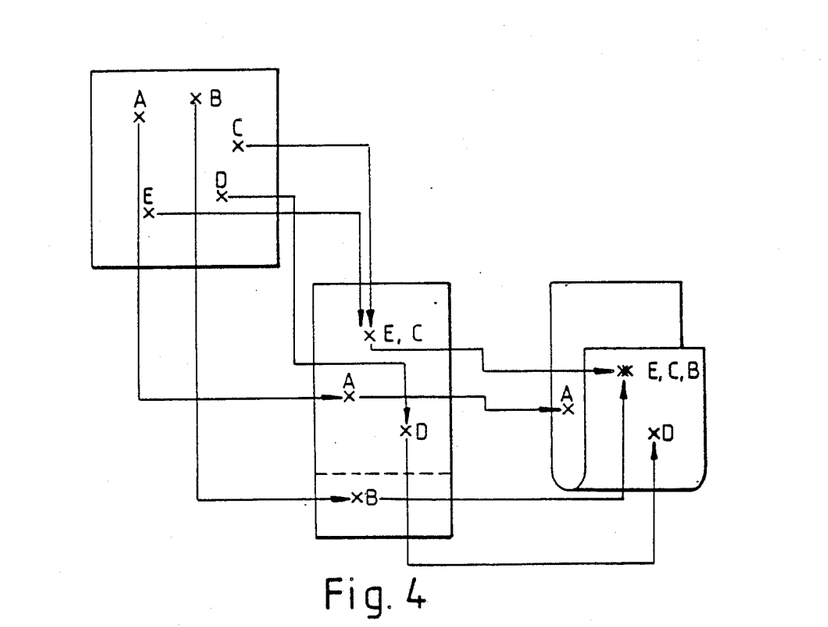
FIG. 4 is a diagram illustrating the concept of mapping of pattern domains.

It will be realised that the weighted sum which would be produced by the accumulator without the modulo x restriction represents a mapping of the possible patterns—a few of which are represented in FIG. 4 as crosses A to E within a notional pattern domain P, into a 'sum' domain S the size of which will depend of the values of the coefficients c(j) and the line vector codes $v_0 \ldots v_5$. If the coefficients are widely spaced numerically, then all the patterns will be mapped into different positions within the domain S. If this condition is not satisfied then some patterns will appear as the same pattern in the S domain (see pattern C, E). This is desirable only if the two patterns belong to the same class, of course.

The use of modulo x accumulation reduces the size of the domain S by folding it back upon itself one or more times. A single fold shown for illustration in FIG. 4 where pattern B now coincides with C and E in domain H.

The coefficients and the modulus have to be selected so that an acceptably low value of modulus is achieved whilst ensuring that, if possible, only those patterns belonging to the same class are mapped to the same values of H (though a few errors may, as discussed below, be tolerated in practice). The inventor is aware of no theoretical proof that this can be achieved, nor of any theoretical method of deriving the values of c(i) and x. Experiment has shown, however, that satisfactory results can be obtained using an iterative procedure for obtaining those values.

A method for obtaining suitable values for the coefficients c(i) and modulus x will now be described. An iterative method is used for obtaining the coefficients c(i) and this requires a periodic test of the iterated coefficients by applying the summation function (without the modulus restriction) to a test sequence of patterns.

Clearly it is not practical to test all $2^{64}$ possible 8×8 patterns, or even the $2^{40}$ patterns possible when expressed as line quantised vectors. Therefore the test is limited to the standard patterns themselves and a further class of patterns defined as variants of the standard patterns. A variant pattern is defined as a standard pattern (in base vector form) with one or more of the constituent vectors substituted by an alternative vector. Each base vector has only a certain range of possibilities for substitution, namely those vectors which have "1"s only in positions where the original vector also has a "1". FIG. 2 lists the variant vectors associated with each base vector. The set of variant patterns includes all possible combinations of such substitutions. This definition of variants represents a criterion for similarity between a variant pattern and a base pattern; i.e. when picture coding is carried out a variant pattern should produce the same code number as does the standard pattern of which it is a variant.

A test of a set of coefficients C=[c(i)] is carried out by applying the summation to the standard and variant patterns to obtain values for the sum h' (the prime indicating that the sum is not a modulo sum). If completed, this process will produce a set of values h' lying in the range $q_{min} \Sigma c(i)$ to $q_{max} \Sigma c(i)$ where $q_{min}$ and $q_{max}$ are the smallest and largest values of q (or v).

However, each new h' generated is checked against previous values of h'. Recurrence of a previous value of h' is acceptable if the patterns giving rise to that value are of the same standard pattern/variant pattern group (i.e. they have the same code number). Otherwise this implies a mapping of distinct patterns to the same value of h' and is referred to as a "clash". The number of clashes occuring in the test is taken as a measure of goodness TEST (C) of the coefficient set C being tested.

Figure 5:
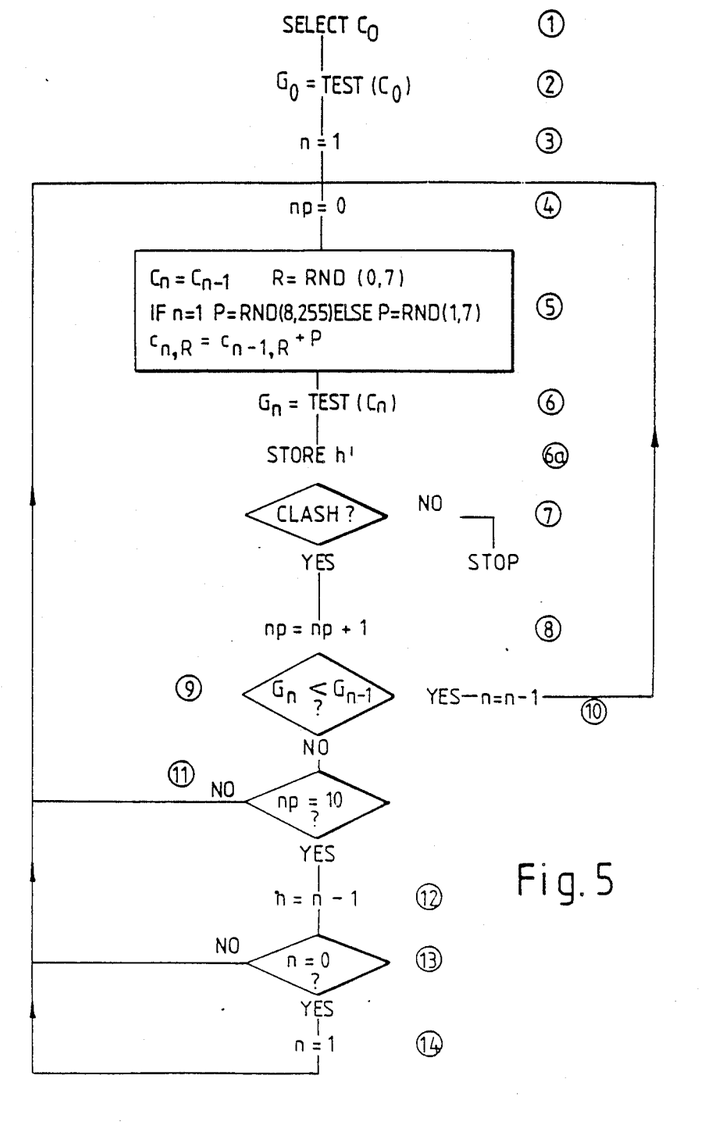
FIGS. 5 and 6 are flowcharts for coefficient and mudulus derivation.

The iteration process is illustrated in the flowchart of FIG. 5. $C_n=[c_{n,0} \ldots c_{n,7}]$ is the nth iteration of the set of coefficients. RND(r, s) indicates the generation of a random number in the range r to s. the process proceeds as follows.

An initial estimate $C_o$ is made (1). This may be entirely random, or the process may be shortened by the operator making an inspried guess of a suitable starting point. This is then tested (2) and iteration and time-out counters are initialised (3, 4). A new value of $C_n$ is derived (5) from $C_{n-1}$ by selecting at random one ($c_{n,R}$) of the coefficients and making a random change P to it. The first iteration employs a large change (say, for coefficient values in the range 0 to 255, in the range 8 to 255) whilst later ones employ only a small change (e.g. in the range 1 to 7). This may be done by a modulo 256 addition, to keep the coefficients in range.

The new coefficient set is now tested (6); if no clash occurs (7), the process is complete. Otherwise the time-out counter is advanced (8), and the result $G_n$ of the test is compared (9) with that $G_{n-1}$ of the previous test. If an improvement has been obtained, the loop counter is advanced (10) and the loop is repeated until a set of coefficients is obtained which does not result in a clash. This requirement may however be relaxed, either because it is not attainable, or in order to reduce the iteration time and the iteration terminated when the number of clashes in a test is less than a given proportion e.g. 5 or 10% of the number of patterns tested. Alternatively, the number of iterations may be limited. Where clashes are permitted in this way, it is necessary to decide which of the two (or more) classes which map to the particular value of h' that value of h' is to be taken to represent. To minimise the number of classification errors which result, one will usually select the class which has the highest probability of occurrence in a typical picture.

If at any time an improvement is not obtained, the latest coefficient set is discarded by failure to increment the loop counter before trying a further change (11). If ten unsuccessful attempts have been made to improve upon a particular coefficient set this implies that the process is proceeding in the wrong direction and the loop counter is decremented (12) so that both the latest and preceding sets are discarded. Of course (13, 14) this restriction does not apply to the first iteration (or to subsequent instances were the process falls back to $G_O$).

Termination of the iteration provides a set of coefficients $C_n$ which give no clash (or a limited number of clashes) in the test when the modulus restiction is not applied to the summation. The set of values $h'_j$ (j=0 .. . T-1, where T is the number of patterns tested) obtained using that set of coefficients are assumed (6a) to have been stored and are not processed to find the modulus x. This is achieved by converting the set of h' for successive values of x starting from M, where M is the number of standard patterns.

Figure 6:
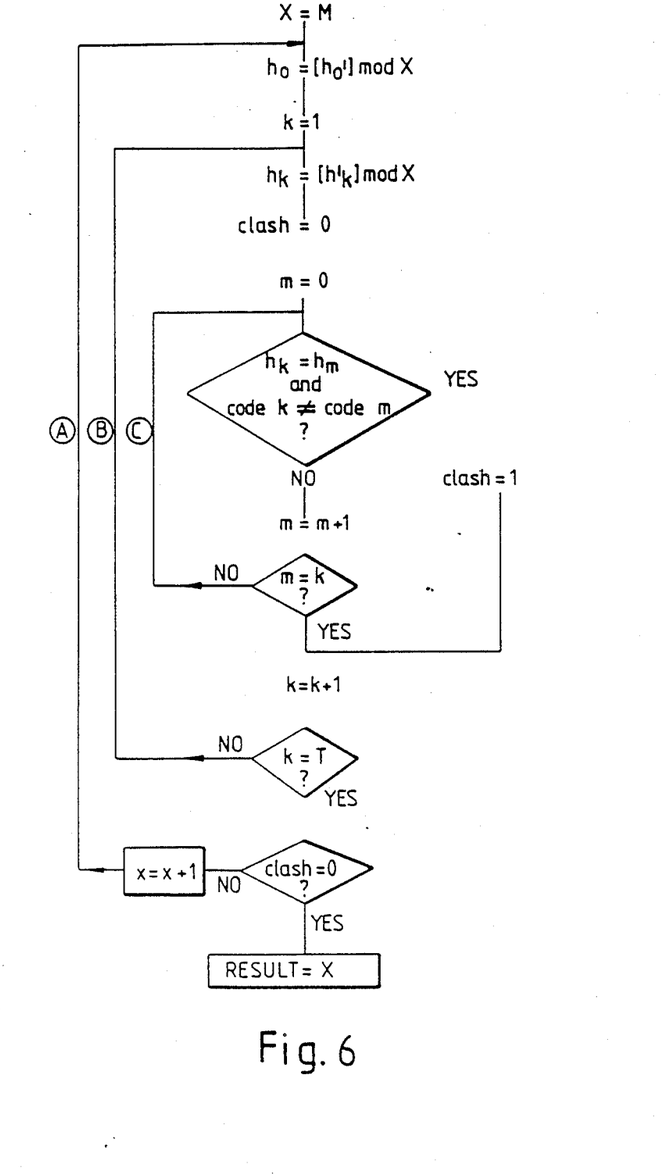

The smallest value of x which does not give rise to a clash (as defined above)—or a limited number of clashes —is the required result. This process is illustrated in the flowchart of FIG. 6. The outer loop A examines each value of x in turn and terminates when it finds a value that does not give rise to a clash. The middle loop B calculates, for the current modulus x, each successive value of $h_k$ whilst the inner loop C checks $h_k$ against all previous values of h at that value of x, for a clash.

It will be observed that not all possible input patterns have been tested in the derivation of the coefficients and modulus. It is intended that the standard patterns and their variants should have been selected to cover the patterns of greatest interest. In this example, patterns more than half of whose locations contain "1" are intended to be represented by a standard "all ones" pattern ($Z_{13}$). These and other untested patterns may in operation give rise to spurious results and therefore the method includes the further step of checking the result. The standard pattern corresponding to the code obtained is compared with the input pattern. If the latter contains a "1" in any location where the former does not, the check fails, and $Z_{13}$ is substituted for the code obtained. The operation is indicated schematically in FIG. 1 by test unit 9 and changeover switch 10. This process will also compensate for errors caused by the alternative relaxed clash criterion referred to above.

Another application of the invention is in the generation of motion vectors. This involves the comparison of a block of a previous frame of image with shifted blocks f the current frame (or vice versa), to ascertain the block position within the current frame to which the previous block most closely corresponds and form a motion vector representing the magnitude and direction of movement. One use of this technique is in inter-frame coding systems where the movement vector can be transmitted to the receiver and used to improve the efficiency of the previous frame as predictor by instead using the previous frame with appropriate parts of the image shifted.

As before, correlation methods are slow. The use of movement vectors in this way does not require that the match between the shifted and unshifted blocks be exact, as long as the result is a better prediction than the previous frame unmodified.

The results of the motion vector generation now to be described may be used directly or may form a first estimate to limit the "area of search" for conventional motion vector generation methods.

It is assumed that all blocks of the picture have been assigned code numbers as in the manner described above (based on element values rather than transform coefficients). One proceeds firstly be locating one or more blocks having the "all moving" code $Z_{13}$—ie identifying those areas of the picture where a substantial amount of movement is occurring.

For each such block, a comparision is made between the codes for that block position in the current and previous frames to ascertain the direction of movement which this represents (as will be described in more detail below). The eight surrounding blocks are similarly examined, and if consistency is obtained (eg if more than half the directions deduced are the same) then this direction is taken as the required estimate.

Figure 7:
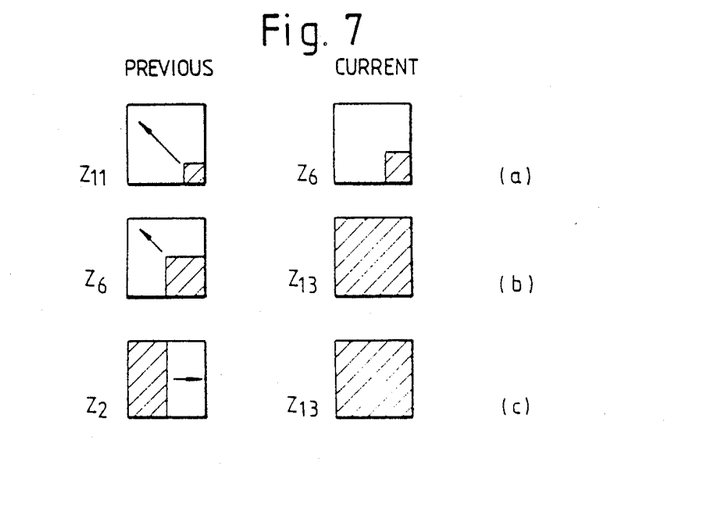
FIG. 7 is a diagram illustrating motion vector generation.

The comparison process is illustrated in FIG. 7. If the codes for the previous and current frames are $Z_{11}$ and $Z_6$, representing the standard patterns illustrated in FIG. 7(a) then the direction of movement is assumed to be as illustrated by the arrow. FIGS. 7(b) and (c) illustrate further examples. A lookup table may be provided with motion vector parameters corresponding to each code pair.

If of course a comparison of wo blocks show that they ae totally moving, then no information is obtained and the decision is made on the basis of the comparisons of the blocks surrounding that block or—where adjacent blocks are also totally moving in both frames—the blocks surrounding a group of such blocks.

I claim:

1. An apparatus for classifying a set of values representing a two-dimensional pattern, comprising summation means for forming a weighted sum, modulo x, of those values, where x is an integer less than $2^p$, p being the number of values in the set; and a store having x locations each containing a class identification word representing one of a set of standard patterns, the address inputs of the store being connected to receive the output of the summation means.

2. An apparatus according to claim 1 including means for receiving data representing respective elements of the pattern and identifying, for each of a plurality of groups of elements of the pattern, that one of a set of predefined such groups, each of which has a code associated with it, which that group most closely resembles according to a predetermined criterion, the codes associated with the groups thus identified forming the set of values.

3. An apparatus according to claim 1 or 2 further including test means for comparing the two dimensional pattern with the standard pattern corresponding to the class identification word obtained at the output of the store, and substituting an alternative class identification word in the event that the pattern does not belong, in accordance with a predetermined classification criterion, to the same class as that standard word.

4. An apparatus according to claim 1 or 2 in which the weighted sum is formed by a summation function of the form:

$$h = \sum_{i=0}^{N-1} q(i) \cdot c(i) \quad \text{MOD} x$$

where q(i) are the said values, N is the number of values in the set, and c(i) are weighting coefficients which have been derived by an iterative process in which a random change is made to the coefficient values, and a modified summation function defined by:

$$h' = \sum_{i=0}^{N-1} q(i) \cdot c(i)$$

is applied to a series of test patterns, the random change being retained for a further iteration only if the change has resulted in an improvement in the number of clashes which occur, a clash being defined as the generation of identical values of h' in respect of two patterns which, in accordance with a predetermined classification criterion, do not belong to the same class, and the process is repeated.

5. An apparatus according to claim 4 in which the modululus x has been derived by finding the smallest integer for which modulo reduction of the h' values obtained for the set of coefficients found by the iteration results in no clash, or in fewer than a predetermined number of clashes.

6. A video coding apparatus having inter-frame coding means and means generating a movement matrix indicating those elements of a picture pattern which have substantially changed between frames, an apparatus according to any one of the preceding claims 1 or 2 for classifying such matrices, and means for transmitting to a receiver, for each picture pattern, the corresponding class identification word and information concerning elements of the picture pattern selected according to the standard pattern associated with that class identification word.

7. A video coding apparatus according to claim 6 including means for generating a motion vector in respect of a moving picture area by comparing the class identification words for the corresponding areas in two successive frames.

8. A video coding apparatus according to claim 7 in which the comparison is effected by employing the two class identification words to access a look-up table in which are stored motion vectors corresponding to respective class identification word combinations.

9. A method for classifying a set of values representing a two-dimensional pattern, said method comprising:
forming a weighted sum, modulo x, of those values, where x is an integer less than $2^p$, p being the number of values in the set; and
using said weighted sum to address a store having x locations each containing a class identification word representing one of a set of standard patterns.

10. A method according to claim 9 further including comparing the two dimensional pattern with the standard pattern corresponding to the class identicidation word obtained at the output of the store, and substituting an alternative class identification word in the event that the pattern does not belong, in accordance with a predetermined classification criterion, to the same class as that standard word.

11. A method according to claim 9 including receiving data representing respective elements of the pattern and identifying, for each of a plurality of groups of elements of the pattern, that one of a set of predefined such groups, each of which has a code associated with it, which that group most closely resembles according to a predetermined criterion, the codes associated with the groups thus identified forming the set of values.

12. A method according to claim 9 or 11 in which the weighted sum is formed by a summation function of the form:

$$h = \sum_{i=0}^{N-1} q(i) \cdot c(i) \quad \text{MOD} x$$

where q(i) are the said values, N is the number of values in the set, and c(i) are weighting coefficients which have been derived by an iterative process in which a random change is made to the coefficient values, and a modified summation function defined by:

$$h' = \sum_{i=0}^{N-1} q(i) \cdot c(i)$$

is applied to a series of test patterns, the random change being retained for a further iteration only if the change has resulted in an improvement in the number of clashes which occur, a clash being defined as the generation of identical values of h' in respect of two patterns which, in accordance with a predetermined classification criterion, do not belong to the same class, and the process is repeated.

13. A method according to claim 12 in which the modululus x has been derived by finding the smallest integer for which modulo reduction of the h' values obtained for the set of coefficients found by the iteration results in no clash, or in fewer than a predetermined number of clashes.

14. A video coding method using inter-frame coding and generating a movement matrix indicating those elements of a picture pattern which have substantially changed between frames, including a method according to claim 9 or 10 for classifying such matrices, and transmitting to a receiver, for each picture pattern, the corresponding class identification word and information concerning elements of the picture pattern selected according to the standard pattern associated with that class identification word.

15. A video coding method according to claim 14 including generating a motion vector in respect of a moving picture area by comparing the class identification words for the corresponding areas in two successive frames.

16. A video coding method according to claim 15 in which the comparison is effected by employing the two class identification words to access a look-up table in which are stored motion vectors corresponding to respective class identification word combinations.

* * * * *